Figure 1:
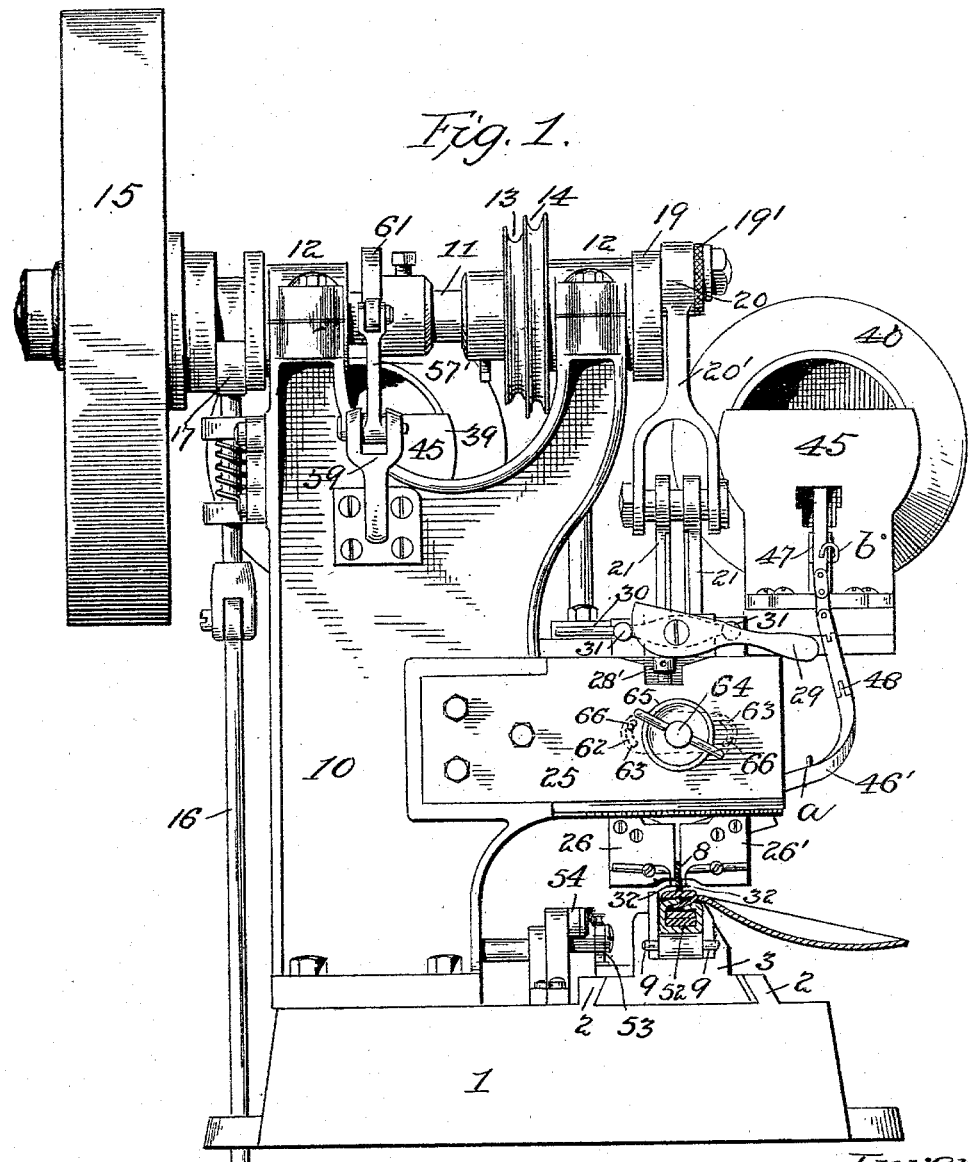

(No Model.) 5 Sheets—Sheet 1.

W. E. VILLINGER.
MACHINE FOR MANUFACTURE OF CHEEK LOOPS.

No. 551,297. Patented Dec. 10, 1895.

Attest
Inventor
William E. Villinger
by Ellis Spear
Atty.

(No Model.) 5 Sheets—Sheet 2.
W. E. VILLINGER.
MACHINE FOR MANUFACTURE OF CHEEK LOOPS.
No. 551,297. Patented Dec. 10, 1895.
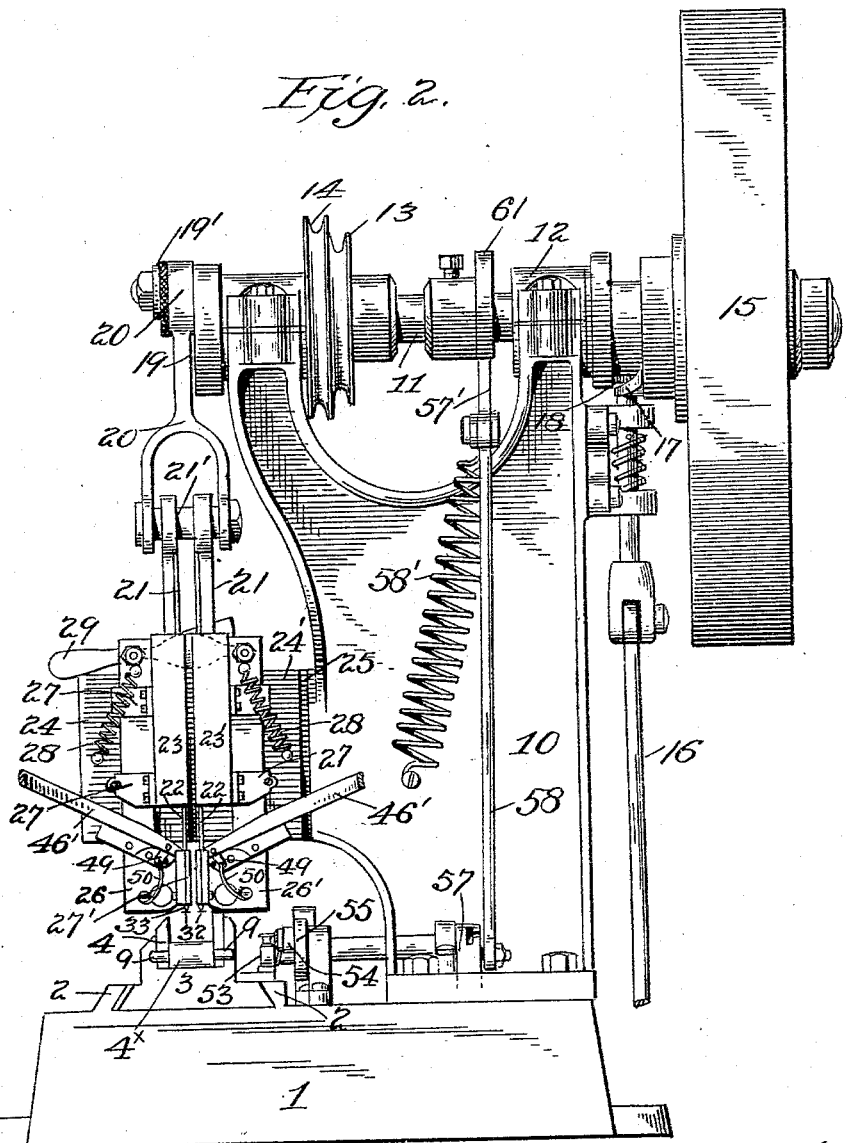

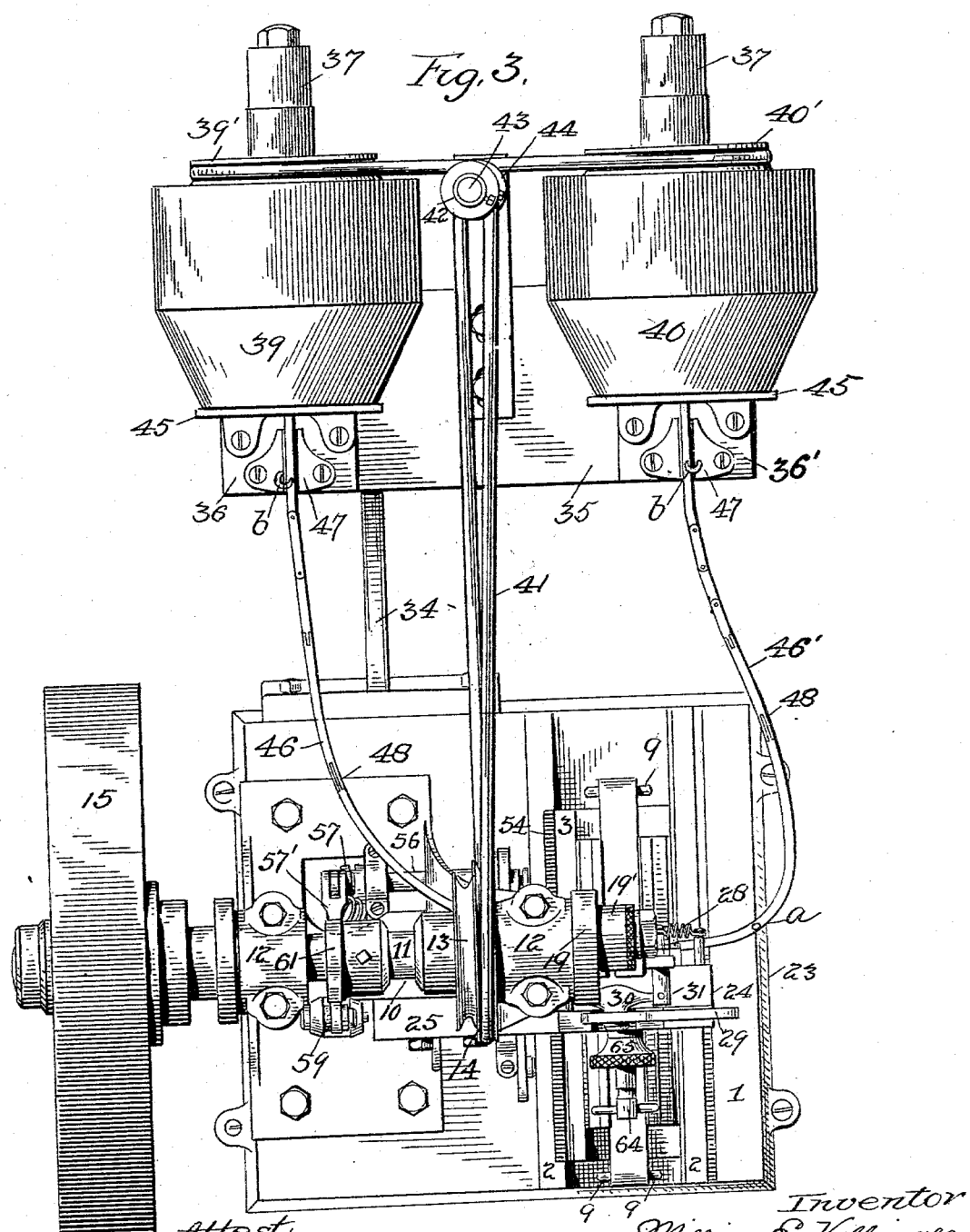

(No Model.) 5 Sheets—Sheet 4.
W. E. VILLINGER.
MACHINE FOR MANUFACTURE OF CHEEK LOOPS.
No. 551,297. Patented Dec. 10, 1895.
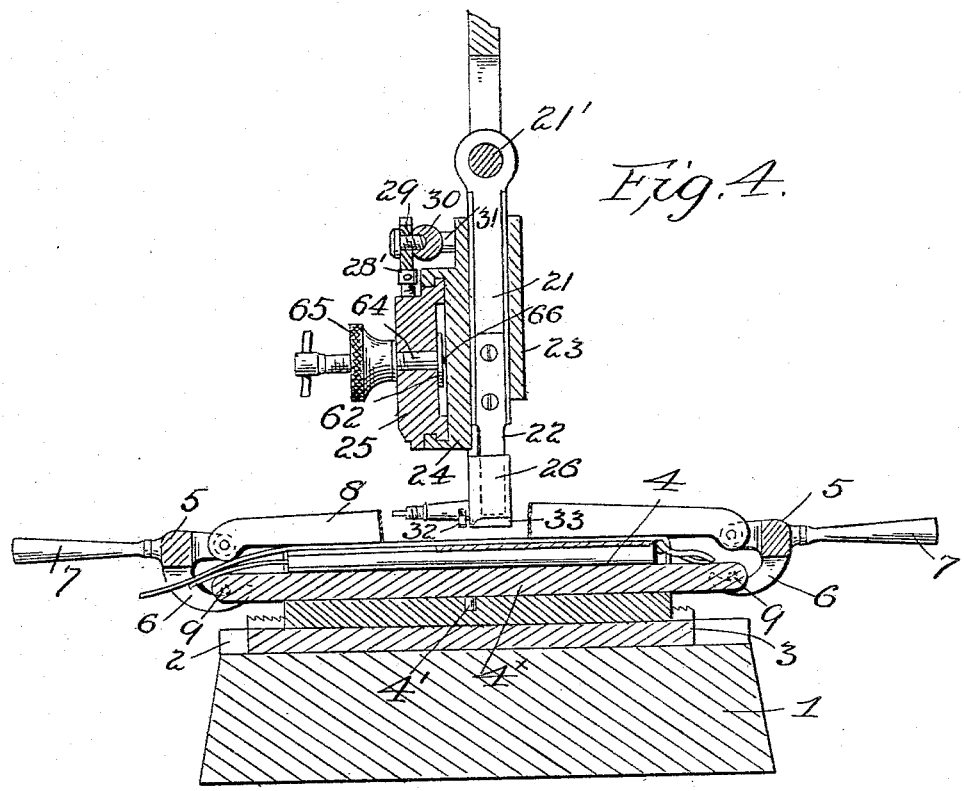
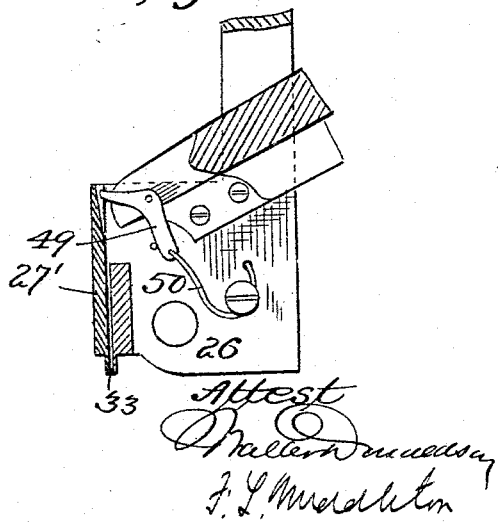
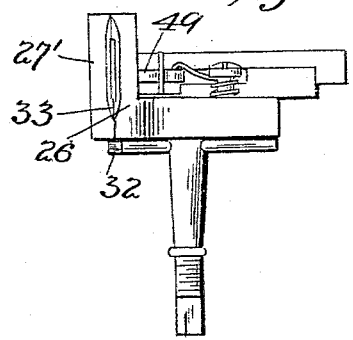

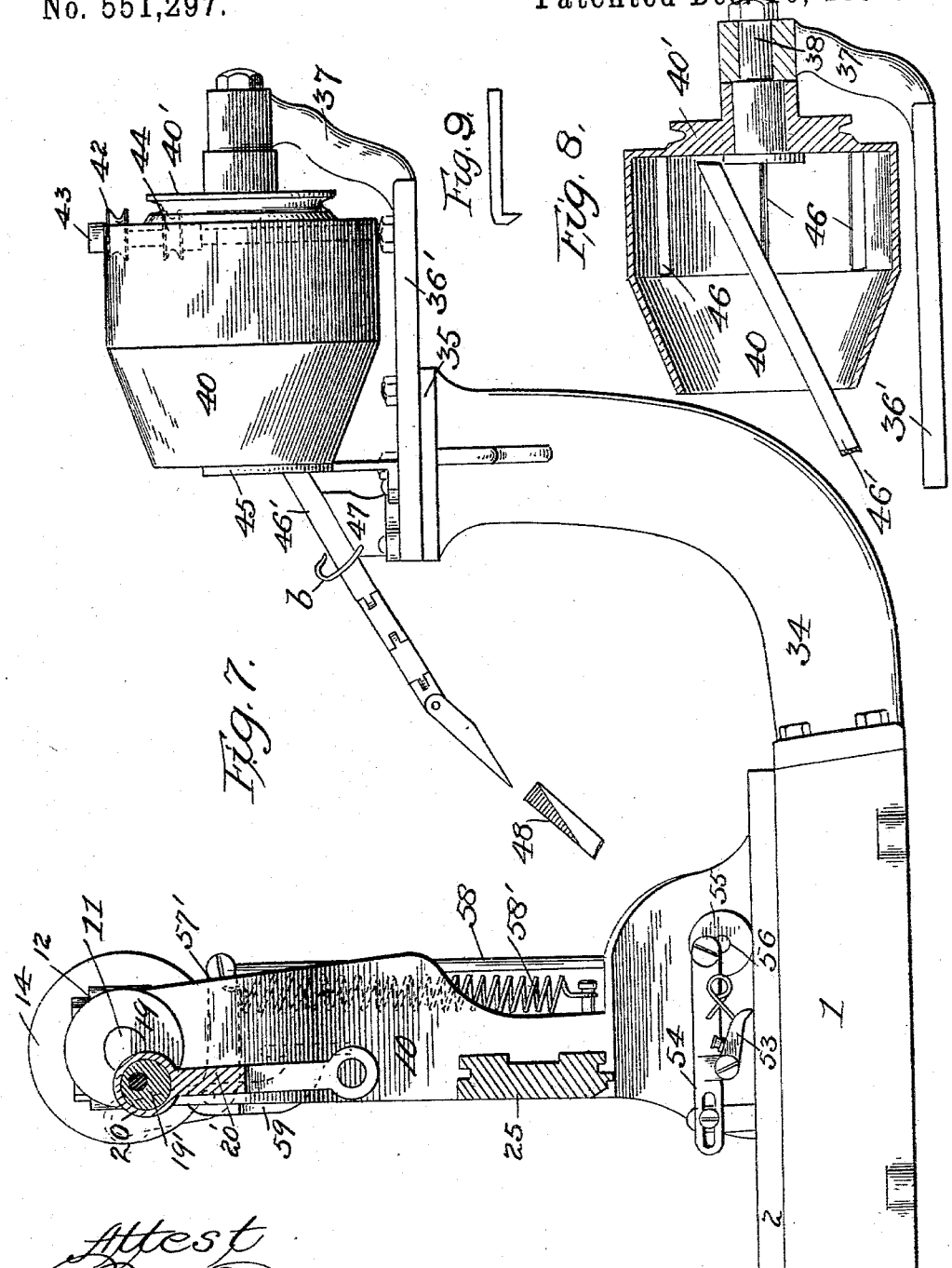

UNITED STATES PATENT OFFICE.

WILLIAM EDWARD VILLINGER, OF WILLIAMSPORT, PENNSYLVANIA, ASSIGNOR TO THE WILLIAMSPORT STAPLE COMPANY, OF SAME PLACE.

MACHINE FOR MANUFACTURE OF CHEEK-LOOPS.

SPECIFICATION forming part of Letters Patent No. 551,297, dated December 10, 1895.

Application filed May 7, 1895. Serial No. 548,449. (No model.)

*To all whom it may concern:*

Be it known that I, WILLIAM EDWARD VILLINGER, a citizen of the United States, residing at Williamsport, in the county of Lycoming and State of Pennsylvania, have invented certain new and useful Improvements in Machines for the Manufacture of Cheek-Loops, Hame-Tug Loops, and the Like, of which the following is a specification, reference being had therein to the accompanying drawings.

My invention relates to the manufacture of harness, and particularly to the production of cheek-loops, hame-tug loops, breeching-loops, and the like.

The machine is illustrated and described in the present instance as used in the manufacture of cheek-loops, but I do not wish to limit myself in this respect, as I may make such immaterial changes as might be necessary for the manufacture of the articles hereinbefore specified without departing from the spirit of the invention.

So far as I am aware it has heretofore been necessary in the manufacture of these articles to first secure the parts together temporarily by tacking, and then secure the parts by the permanent fastenings.

In the present invention I entirely avoid the use of a temporary fastening of any description, and also provide improved means for permanently fastening all the parts together in a single operation.

My invention therefore includes the means for holding the loop together before the fasteners are applied, as well as the means for securing the parts permanently by the fasteners.

My invention further includes the details of construction, as will be hereinafter described and particularly pointed out in the claims.

The invention is illustrated in the accompanying drawings, in which—

Figure 1 is a side elevation. Fig. 2 is an elevation of the opposite side of the standard, the hoppers being removed. Fig. 3 is a plan view. Fig. 4 is a detail sectional view. Fig. 5 is a bottom plan of the raceway-supporter. Fig. 6 is a detail of trip. Fig. 7 is a front elevation of the machine with the loop-box and adjoining parts removed. Fig. 8 is a sectional view of one of the hoppers. Fig. 9 is a detail of a modification of the channel-knife.

In the drawings the base of the machine is shown at 1, and the upper face thereof is provided with the guiding-ribs 2 between which the carriage 3 slides. This carriage carries the loop-box 4, which consists of the bottom $4^\times$ and the two longitudinal sides, the outside upper edge of one side being beveled. The cheek-loop is formed entire and placed within this box, the blinker projecting over the beveled edge of the box, as in Fig. 1, which allows it to rest at a slight inclination, this being its proper position in relation to the billet-loop. The bottom side of the loop-box is provided with a depending stud $4'$, which fits into a corresponding socket in the carriage 3 and locks the parts together. For holding the cheek-loop within the box, I have provided the clamps 5, provided with the forked fingers 6 and the operating-handles 7. The clamps are connected by the bar 8, to each end of which the clamps are pivoted. The bar 8 rests upon the loop held within the box, and the fingers 6 engage the stud 9 projecting on opposite sides of each end of the bottom of the loopbox. The fingers are curved upwardly, and when the loop is in position, with the bar 8 resting thereon, the handle 7 is depressed, and the studs 9 will ride up on the fingers and clamp the bar 8 down firmly on the loop, thus securely holding it in compact form within the loop-box.

Extending upwardly from the base 1 is the standard 10, the upper end thereof being forked, and the arms thereof are provided with sockets which form one half of the bearing for the shaft 11. The caps 12 are bolted to these arms and form the other half of the bearing. This shaft carries the pulleys 13 14 and is driven by the driving-wheel 15 by suitable clutch mechanism which is adapted to be operated preferably by a foot-pedal connected to the rod 16, which carries the segmental cam 17, which engages and operates the stud 18 to disengage the driving-wheel from the shaft 11. The disk 19 is carried on the opposite end of the shaft 11 and the eccentric $19'$ is pivoted to this disk. Fitting over this eccentric is the strap 20, forming the upper end of the pitman $20'$, the lower end of which is yoked, and within said yoke are the plates 21, which are pivoted on the pin 21', extending through the eyes in the upper end of said plates and supported in the corresponding eyes in the lower ends of the arms forming said yoke. These plates carry the drivers 22 and are guided in their vertical movement by the boxes 23 23', which extend from the horizontally-adjustable plates 24 24', which are guided in the ways provided in the plate 25, which is bolted to the standard 10.

Knives 32 are provided for cutting a channel in each side of the billet for the reception of the fastening-staples, and these knives are secured to the lower face of the vertically-adjustable plates 26 26', which are guided in the caps 27, bolted to the plates 24 24', and normally pulled downwardly by the spring 28, connected at one end to the upper face of said plates and their lower ends to the plates 24 24'. An adjustable screw 28' is held in a recess in the upper side of the plate 25 and the cam-face of the lever 29, which is pivoted to the bar 30, held in the lugs 31, projecting from the plates 26 26', bears on the head of this screw. By adjusting this lever the plates 26 26', carrying the knives, are lifted, which will lift the knives from engagement with the billet or depress the knives and bring them in position to cut the channel, as the case might be. These knives are preferably of inverted-T shape, although I do not wish to limit myself to their particular shape, as any form of knife might be used that would cut a channel of such a form that the abutting edges above the bottom thereof would overhang said bottom. The wedge-shaped followers 33 depend from the under sides of the plates 26 26' directly in the rear of and in line with the cutting-knives, and these followers open the channel by raising and turning back the abutting edges of the flap as the carriage 3 is fed forward, as will be hereinafter described.

For feeding the staples which constitute the fasteners for the loop beneath the drivers, I attach the bracket 34 to one side of the base 1, and this bracket supports the platform 35, to which are bolted the plates 36 36', having the arms 37 extending upwardly from the ends thereof carrying the pins 38, upon which are journaled the hoppers 39 40, which are rotated by means of the belt 41 passing over either one of the pulleys 13 14 and around the guide-pulley 42, journaled on the shaft 43, held in a plate bolted to the platform 35, and then passing from pulley 42 over the pulley 39' carried by the hopper 39, over the pulley 40' carried by the hopper 40, back around the guide-pulley 44 journaled on said shaft 43 and over the first-mentioned pulley. It will thus be seen that as the main shaft rotates the hoppers are likewise rotated. These hoppers are cylindrical in cross-section and are entirely closed at the ends carrying the pulley, their opposite ends being tapered. These tapered ends are partly closed by the plates 45, which are bolted to the plates 36 36', sufficient openings being left above the upper edges of said plates to allow of the hoppers being filled. To keep the staples separated, a series of ribs 46 are secured to the inner side of the hoppers. The raceways 46' extend into the hopper through openings in the plates 45 and are supported near the upper ends on the brackets 47 secured to the platform 35 and at their lower end by the plates 26. These raceways are capable of universal adjustment so as to accommodate themselves to the different movements of the plates 26, and this is accomplished by forming each raceway in two sections, the end of one section being cut at an angle and having a tongue 48 extending centrally therefrom. The adjoining section is cut at an angle to correspond to the first section and is provided with a central recess into which the tongue 48 loosely fits, the inclined ends overlapping each other. The sections are thus provided with automatic sliding connection. The upper sections of the raceways are formed in supplemental sections vertically and horizontally pivoted together, which permits of the universal movement of the said raceways. For guiding the staples into the channel in the billet, cut by the knives, the lower portion of the plates 26 are provided with recesses which extend entirely through the bottom thereof, and the plates 27' provided with similar recesses are fastened thereto, which form the staple-guide. These plates also carry one section of the channel openers or followers, the other halves depending from the bottom of the plates 26. These plates, as shown in Fig. 5, when brought together with their recessed faces opposite each other, form the channel for the staples and for the drivers, said channels extending through the followers. This construction is also shown in section in Fig. 6.

The ends of the raceways which are connected to the plates 26 26' are bifurcated, and pivoted in said bifurcations are the trips 49, the horizontal ends of which normally extend across the staple-channels, being held in that position by means of the springs 50. The staples sliding from the hoppers come successively on the end of this trip, when the drivers descending force down the end thereof and the staple through the guiding-recess into the channel in the billet. A plate 52 is inserted within said billet-loop for clinching the staples on the inner side thereof.

As the drivers rise, the trip resumes its normal position and the succeeding staple moves up on the end thereof. The carriage carrying the loop-box is, in the meanwhile, fed forward by the pawl 53 engaging with the rack 54 carried by the carriage 3. This pawl 53 is pivoted on an extension of the arm 54, eccentrically pivoted to the disk 55, which is rotated through the shaft 56 journaled in the standard 10, said shaft carrying the crank-arm 57 connected to the horizontal arm of the bell-crank 57' by the rod 58. The spring 58' is connected to this arm at one end, the opposite end being fastened to a pin projecting from the standard. This spring tends to hold the arm down. The bell-crank is pivoted in an arm of the bracket 59 secured to the standard 10, the vertical arm of said bell-crank being bifurcated and carrying the roller 60, which bears upon the cam 61 carried by the main driving-shaft. The rotation of said cam thus presses the vertical arm of the bell-crank outwardly and raises the horizontal arms which operates the crank-arm 57 and the pawl 53 through the connection hereinbefore specified.

In the manufacture of different widths of cheek-loops it is necessary to widen the distance between the rows of the staples, and this is effected by moving the plates 24 24' farther apart, which will of course adjust the plates 26 26' and the knives, raceways and the channel-opener or knife-followers carried thereby. To adjust these plates 24 24' horizontally a disk 62, having the segmental slots 63 in each end thereof, is interposed between said plates and the plate 25. This disk is carried on the end of the key 64, which extends through the plate 25 and is provided with a handle and a nut 65 for locking the key and the disk carried on the end thereof in adjusted position. The pins 66 project from the plates 24 24' into the slot 63, and as will be readily seen the turning of this disk will bring the plates 24 24' closer together or move them farther apart. In the operation of the machine I find it convenient to first fill the raceways with staples by rotating the hoppers, and a pin, as at a, is inserted in a socket provided therefor in the raceways, and the staples strike against this pin. When a sufficient number of staples are on the raceways or slide, this pin is withdrawn, allowing the staples to come beneath the punches. The hopper will, after the machine is started, feed the staples rapidly enough to supply the drivers.

To prevent one staple riding on the other and sliding down the raceways in that position, I provide a finger b, which extends very closely to the surface of the raceways, and this will stop the onward flow of staples if two should become entangled, thus allowing the operator to remove such staples.

What I claim is—

1. In combination, the hopper, the driver, the raceway leading from said hopper, the support therefor and for the driver, the means for adjusting said support and the guides therefor, substantially as described.

2. In combination, the hopper, the driver and the race way comprising the upper and lower sections, and a detachable connection between the ends of said sections, whereby the end of one of said sections is permitted to slide upon the other, substantially as described.

3. In combination, the hopper, the driver and the race way comprising the upper section formed of a plurality of links pivoted together to permit of the universal movement of said section, the lower rigid section, and the tongue and groove connection between said sections, substantially as described.

4. In combination, the hoppers, the drivers, the raceways leading from said hoppers to the drivers, said drivers being adjustable to and from each other and the raceways being adjustable with the drivers, substantially as described.

5. In combination, the two drivers, the vertically adjustable plates 26, 26', the plates 24, 24' adjustable horizontally and carrying the plates 26, 26' and means for operating the drivers.

6. In combination, the hopper, the standard, the stationary plate 25 supported thereby, the adjustable plates 24, 24' guided thereby, the guiding boxes secured to said adjustable plate, the drivers moving in said boxes and the slotted disk adapted to move said adjustable plates horizontally with the drivers thereon and the nut for locking said parts in adjusted position.

7. In combination, the base, the guide way thereon, the carriage movable in said guides, the loop box carried thereby with means for holding the loop within said box and means for securing the parts of said loop together at a single operation, substantially as described.

8. In combination, the base, the guides, the carriage movable therein, the loop box carried by said carriage and the clamp for securing the loop firmly within said box, substantially as described.

9. In combination, the base, the guides, the carriage movable in said guides, the loop box carried thereby, the lugs projecting from an extension on each end of said box, the bar 8 adapted to bear upon the upper side of the cheek loop and the clamps pivoted on each end of said plate and engaging said studs, said clamp being adapted to be depressed to clamp the loop within said box, substantially as described.

10. In combination with the base, a carriage, the loop box, a bar 8 adapted to bear upon the loop in the box and pivoted clamps at each end of the bar engaging the loop box, substantially as described.

11. In combination, the hopper, the race way, the driver, the plate supporting said race way, the channel knives carried thereby, the loop box and means for depressing said knives to bring them into engagement with the loop, substantially as described.

12. In combination, the hopper, the driver, the race way leading from said hopper, the adjustable plate, the channel knife, the loop box and the follower or channel openers depending in rear of said knife.

13. In combination, the hopper, the driver, the race way, the loop box, the race way support, the channel knife and the opener or follower carried thereby, said support having a recess extending vertically therethrough and through said follower for directing the staples into the channel formed in the loop.

14. In combination, the inverted T shaped knife, the follower in rear thereof, the work support, the driver, means for operating the same, means for feeding the staples to the driver and means for moving the work support with the work to the knife and driver.

15. In combination, the work support, the knife, the channel opener in rear thereof having a passage through it vertically for the staples, means for feeding the staples thereto and the driver with means for reciprocating the same through the said passage.

16. In combination, the base, the guide way thereon, the carriage movable in said guides, the loop box carried by said carriage and the independent clinch bar adapted to be inserted within the loop and rest within said box, substantially as described.

In testimony whereof I affix my signature in presence of two witnesses.

WILLIAM EDWARD VILLINGER.

Witnesses:
   HARRY A. KROUSE,
   CHAS. C. KROUSE.